United States Patent
Jacqué et al.

(10) Patent No.: US 7,174,950 B2
(45) Date of Patent: Feb. 13, 2007

(54) HEAT TRANSFER SYSTEM FOR A SATELLITE INCLUDING AN EVAPORATOR

(75) Inventors: Bernard Jacqué, Toulouse (FR); Emmanuel Texier, Cannes la Bocca (FR); Gérard Cluzet, Mandelieu (FR); Tisna Tjiptahardja, Cannes la Bocca (FR); Marcel Amidieu, Cannes la Bocca (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/446,828

(22) Filed: May 29, 2003

(65) Prior Publication Data

US 2004/0040691 A1 Mar. 4, 2004

(30) Foreign Application Priority Data

May 30, 2002 (FR) .................... 02 06638

(51) Int. Cl.
*F28F 15/02* (2006.01)
*B60H 1/32* (2006.01)

(52) U.S. Cl. .................. 165/104.26; 165/41; 165/86

(58) Field of Classification Search .............. 165/41, 165/104.26, 86; 244/158 R, 159
See application file for complete search history.

(56) References Cited

U.S. PATENT DOCUMENTS

| | | | | |
|---|---|---|---|---|
| 4,345,642 A | * | 8/1982 | Ernst et al. ................. 165/86 |
| 4,420,035 A | * | 12/1983 | Hewitt ....................... 165/273 |
| 4,738,304 A | * | 4/1988 | Chalmers et al. ........... 165/281 |
| 5,036,905 A | * | 8/1991 | Eninger et al. .............. 165/41 |
| 5,069,274 A | * | 12/1991 | Haslett et al. ............... 165/272 |
| 5,332,030 A | | 7/1994 | Spencer et al. |
| 5,351,746 A | * | 10/1994 | Mackey et al. .............. 165/41 |
| 5,579,830 A | * | 12/1996 | Giammaruti ............ 165/104.27 |
| 5,646,822 A | * | 7/1997 | Bhatia et al. ................ 361/687 |
| 5,649,310 A | * | 7/1997 | Tyner et al. ................. 455/129 |
| 5,699,982 A | * | 12/1997 | Daugherty .................... 244/63 |
| 5,730,211 A | * | 3/1998 | Conway .................... 165/104.14 |
| 5,732,755 A | * | 3/1998 | Cross ............................ 160/57 |
| 5,735,489 A | * | 4/1998 | Drolen et al. ................ 244/163 |
| 5,806,800 A | * | 9/1998 | Caplin ..................... 244/158 R |
| 5,806,803 A | * | 9/1998 | Watts .......................... 244/163 |
| 5,823,477 A | * | 10/1998 | York ........................... 244/163 |
| 5,832,987 A | * | 11/1998 | Lowry et al. ................. 165/86 |
| 5,839,696 A | * | 11/1998 | Caplin et al. ................ 244/159 |
| 5,899,265 A | | 5/1999 | Schneider et al. |
| 6,052,285 A | * | 4/2000 | Hileman ...................... 361/699 |
| 6,069,791 A | * | 5/2000 | Goto et al. .................. 361/687 |
| 6,118,654 A | * | 9/2000 | Bhatia ........................ 361/687 |
| 6,148,906 A | * | 11/2000 | Li et al. .................. 165/104.33 |
| 6,481,670 B1 | * | 11/2002 | Bigelow et al. ............ 244/163 |

FOREIGN PATENT DOCUMENTS

| | | | | |
|---|---|---|---|---|
| EP | 0600192 A1 | 6/1994 | | |
| EP | 0786404 A1 | 7/1997 | | |
| EP | 1031511 A2 | * | 8/2000 | ................. 165/41 |
| JP | 2000-97585 A | * | 4/2000 | ................. 165/41 |
| JP | 2003-276696 A | * | 10/2003 | ................. 165/41 |

* cited by examiner

Primary Examiner—Teresa J. Walberg
(74) Attorney, Agent, or Firm—Sughrue Mion, PLLC (57) ABSTRACT

A heat transfer system includes a heat transfer passage in the vicinity of a source of dissipated heat on a satellite to collect heat dissipated by the source and a fluid loop including an evaporator having over part of its path a maximum surface area of its external walls in contact with external walls of the heat transfer passage.

26 Claims, 6 Drawing Sheets

FIG_1

FIG_2

FIG_3

FIG_4

FIG_5a

FIG_5b

FIG_5c

FIG_5d

FIG_6a

FIG_6b

FIG_6c

HEAT TRANSFER SYSTEM FOR A SATELLITE INCLUDING AN EVAPORATOR

This application is based on French Patent Application No. 02 06 638 filed May 30, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a heat transfer system adapted to evacuate dissipated power generated by equipment on board a spacecraft and in particular a satellite.

2. Description of the Prior Art

During operation of a spacecraft in orbit, onboard electrical and electronic equipment dissipates a quantity of heat which is dependent on the intrinsic efficiency of the equipment and can be high in some high-power equipment. To maintain the thermal environment of the equipment in temperature ranges compatible with its operation and performance, it is necessary to provide a heat transfer system to collect and transport the heat and then evacuate it into space.

A number of prior art systems perform this transfer of heat. They include a system for transporting and distributing heat and a system for transferring heat by radiation. The principle of the heat transfer system is based on the use of a fluid circulating between a hot area in which heat is dissipated and a colder area in which heat absorbed by the fluid is evacuated to an external medium by radiation via one or more fixed or deployable radiators. The operating principle of the system is therefore based on its transport and exchange capacity and, in the case of two-phase systems, the fluid evaporation/condensation properties (the latent heat of the fluid).

A first type of prior art system is known as a heat pipe. This system includes a rigid metal tube (for example an aluminum tube) in which a heat exchange fluid (generally ammonia) circulates and relies on liquid-vapor phase change properties and the capillarity properties of a liquid. Thus a heat pipe is a closed two-phase system in which vapor generated in the hot area (referred to as the evaporation area) is aspirated toward a colder area (where the pressure is lower) and condenses therein on the metal wall of the tube. The liquid phase of the fluid flows along the metal wall of the tube in the opposite direction to the flow of the vapor phase of the fluid, which remains confined to the center of the tube. The fluid is returned along the wall by a capillary structure (a wick or longitudinal grooves) linking the two ends of the tube and serving as a capillary pump and as a separator of the liquid-vapor phases.

Heat transfer systems based on heat pipes are frequently used in satellites, but have two major limitations. Firstly, the mechanical rigidity of heat pipes means that they cannot be used to transport heat to radiating surfaces that are deployable in orbit (deployable radiators), as this necessitates reconfiguring the heat path in space. Secondly, in the case of high-power telecommunication satellites, their limited performance in terms of heat transport capacity (which is the order of a few hundred W.m) and transport distance necessitates the use of different systems in which heat can be transported over greater distances, along more complicated heat paths, which are sometimes three-dimensions and reconfigurable in flight (to deploy radiators) and the transport function may need to be actively assisted by mechanical pumping. These heat transfer systems are fluid loop systems.

The loops can be single-phase with pumping, two-phase with capillary pumping, or two-phase with mechanical pumping. Fluid loop systems have three parts: an evaporator, a radiator, and flexible or rigid fluid lines.

The operating principle of single-phase fluid loop systems is similar to that of central heating using the sensible heat of the fluid. The heat-exchange fluid (Freon™, water, ammonia, etc.) absorbs power dissipated by the equipment, thereby increasing in temperature in the vicinity of the heat source, and rejects that power when it cools in one or more radiators, without changing its physical state. The fluid is pumped by an active pumping system. Mechanical pumping is effected by an electrically powered pump providing the required flowrate of fluid in the loop. Quite apart from their energy consumption, mechanical pumps can generate microvibrations that can be incompatible with other equipment and instrumentation onboard the satellite. Moreover, they can also have a durability (service life) that represents a constraint on the mission of the satellite, in that their durability is limited by premature wear of some of the internal mechanical parts of the pump.

Like heat pipes, two-phase fluid loops use, in addition to the increase in temperature, the latent heat of evaporation of the fluid to absorb and reject heat. Thus the heat-exchange fluid changes state as it circulates in the loop. It evaporates when it absorbs heat dissipated by the equipment in the evaporator and rejects that heat when it condenses in one or more condensers situated at the level of the radiator. The fluid is circulated in the loop either passively, by capillary action, or using a mechanical pump upstream of the evaporator. The vapor and liquid phases are separated, except in the condenser and the evaporator, in which they flow in the same direction, unlike in a heat pipe, in which the two phases circulate in opposite directions in the same tube. This type of system has a capillary structure only at the level of the evaporator.

To increase the capacity of new generation high-power satellites to reject heat by radiation into space, it proves necessary to use deployable radiators to increase the dissipation surface areas available on the satellite. Given the powers to be dissipated, the surfaces of the body of the satellite are insufficient. The principle of the deployable radiator is to increase the radiation surface areas available on the satellite when they are in the deployed position, but a fluid loop is also used, as described above, to bring the dissipating power of the network of heat pipes supporting the dissipating equipment to the radiating surfaces of the deployable radiator, whilst allowing deployment of the radiator before it begins to operate.

For high-power satellites necessitating the presence of deployable radiators, a number of architectures are feasible for collecting and transporting heat from the equipment to the deployable radiators. Either the fluid loop collects the heat directly at the level of the equipment and transports it to the radiating surfaces of the radiator or a network of heat pipes collects the heat at the level of equipment and transports it to exchange areas in which the fluid loops recover it and feed it to the radiator. The first solution is suitable for single-phase fluid loops and the second solution is suitable for all types of loops.

In the case of the second solution, the network of heat pipes includes a primary network of heat pipes which collect and distribute the power to be dissipated from the equipment in a preferential direction. The first heat pipes are either integrated into the panel that supports them or mounted on the panel. A second network of heat pipes, known as coupling or crossing heat pipes, couples the heat pipes of the primary network together in a transverse direction. The first heat pipes are either integrated into the panel that supports them or mounted on the panel. The fluid loop thermally couples the radiating surface of the deployable radiator on which the condenser of the fluid loop is installed to the primary and coupling networks which drain heat from the equipment. As explained above, the fluid loop includes an evaporator for collecting the power to be dissipated from the networks of heat pipes on the panels of the satellite, a vapor line for feeding the power to be dissipated to a condenser, and a liquid return line for feeding the liquid back to the evaporator. A tank upstream of the evaporator stores liquid not circulating in the loop. The condenser is connected to the radiator, whose thermo-optical properties are adapted to reject power to the external medium. The vapor and liquid lines can be flexible to allow deployment of the radiator.

The efficiency of the deployable radiator (its rejection capacity) is largely dependent on the effective thermal gradient along the path between the dissipating equipment and the radiating surface. To a first approximation, the lower the thermal gradient, the more efficient the radiator. Also, the shorter the heat path, the lower the gradient. In particular, the operating temperature of the evaporator is a key factor in the efficiency of the loop.

Because heat is transferred primarily by conduction from the equipment to the radiating surface of the radiator, apart from the two-phase transfer in the heat pipes, the contact and exchange areas and surfaces must be thoroughly minimized in terms of their number, maximized in terms of their surface area, and optimized in terms of their quality of thermal contact.

Thus an object of the invention is to propose a heat transfer system making optimum use of radiators, in particular deployable radiators, by increasing the thermal rejection capacity of the satellite and improving the efficiency of the heat path by increasing the contact surface areas at nodes of the heat path.

SUMMARY OF THE INVENTION

To this end, the invention provides a heat transfer system including a heat transfer passage in the vicinity of a source of dissipated heat on a satellite adapted to collect heat dissipated by the source and a fluid loop including an evaporator having over part of its path a maximum surface area of its external walls in contact with external walls of the heat transfer passage.

Thus the invention provides an evaporator design, a method of arranging and integrating the evaporator in the fluid loop of the deployable radiator, and a satellite architecture such that the evaporator has a large contact surface area, whether this is achieved with one or more primary heat pipes or one or more heat pipes of the coupling network.

In one embodiment of the invention the main axis of the evaporator is parallel to the main axes of two heat transfer passages, between which it is located, and each face of the evaporator facing respective heat transfer passages is thermally coupled to the facing face of the passage by surface contact of fins of the passages and the evaporator.

In one embodiment of the invention the two heat transfer passages are coupling heat pipes and a base of the evaporator constituting its third face is coupled by surface contact to a main heat pipe.

In one embodiment of the invention the evaporator has a shape with right-angle corners, i.e. a square or rectangular cross section.

In one embodiment of the invention faces of the evaporator having no surfaces in contact with a heat transfer passage are hollowed out.

Other features and advantages of the present invention will become apparent on reading the following description of embodiments of the invention, which is given by way of illustrative and nonlimiting example.

DETAILED DESCRIPTION OF THE PREFERRED EMBODIMENTS

Items with the same functions are identified by the same reference numbers in all the figures.

The principle of the two-phase fluid loop with capillary pumping is explained next with reference to FIG. 1.

Figure 1:
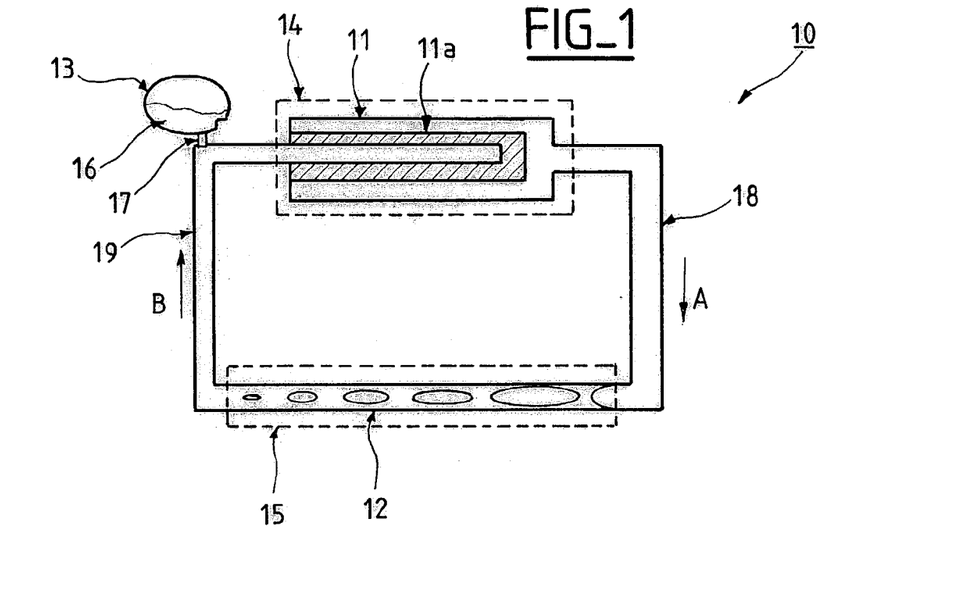
FIG. 1 is a theoretical diagram of a two-phase fluid loop with capillary pumping.

FIG. 1 shows a two-phase fluid loop 10 with capillary pumping comprising an evaporator 11, a condenser 12, and a tank 13. Also shown diagrammatically and in dashed outline are a heat source 14, i.e. the equipment (not shown) dissipating heat onboard a satellite, in the vicinity of which the evaporator 11 is located, and a heat evacuation area 15 situated at the level of a deployable radiator panel (not shown) of the satellite, in the vicinity of which the condenser 12 is located.

The tank 13 of heat-exchange fluid 16, for example ammonia, feeds the loop 10 with fluid via a pipe 17. The fluid 16 in the liquid state, symbolized by cross-hatching FIG. 1, enters the evaporator 11, in which it evaporates. The vapor produced in this way (symbolized by dots in FIG. 1) moves toward the condenser 12 in a transport line 18.

The vapor is then condensed in the condenser 12 and returns to the evaporator via a transport line 19.

The evaporator 11 has a capillary internal structure 11a. Its internal surface has longitudinal grooves all around its circumference and extending from one end to the other. Thus liquid entering the evaporator 11 crosses the capillary wick toward the wall of the evaporator, where it collects the power to be dissipated. It then evaporates on the surface of the capillary structure, on which are formed menisci initiating capillary forces. The increase in capillary pressure in the wick is proportional to the surface tension of the fluid 16 and inversely proportional to the equivalent radius of the menisci.

On leaving the capillary wick of the evaporator 11, the vapor is therefore collected in the external envelope of the evaporator 11, which is directly interfaced to the heat source 14. Because of the capillary pumping pressure in the loop 10, the vapor is then directed into the vapor line and flows to the condenser 12.

The pressurizer tank 13 is used in particular to regulate the operating temperature of the loop 10 and to prime the loop 10.

The transport lines 18 and 19 are simple, light tubes and induce low pressure losses; they can be bent easily because of their intrinsic flexibility. They have an inside diameter from 4 mm to 10 mm.

The deployable radiator comprises one or more panels mechanically interconnected by means that are not shown. Initially (before the satellite is launched into orbit), the panels are folded one against the other and along the body of the satellite. After the satellite has been launched and placed in orbit, the panels are deployed to constitute a large heat evacuation surface, thereby maximizing their rejection capacity, and are disposed to offer a minimum sight factor to incident sunlight in order to minimize inward heat flow, which degrades the performance of the radiator.

For this type of satellite, the total heat evacuation radiating surface area needed is very large, typically of the order of 60 m². The deployable radiators are aligned with fixed panels of the satellite parallel to the plane of the orbit, for example.

Figure 2:
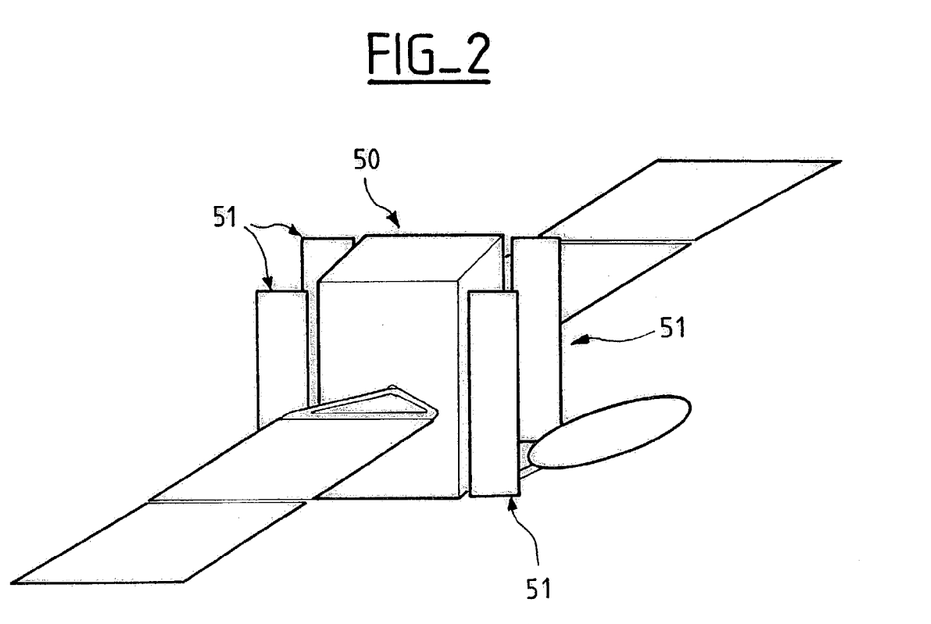
FIG. 2 is a diagram showing a satellite with deployable radiators.

To show a typical position of the deployable radiators on a satellite, FIG. 2 shows diagrammatically a satellite 50 with four deployable radiators 51 (only three of which can be seen in FIG. 2). To simplify the illustration, these deployable radiators are single-panel radiators, but can be replaced with multi-panel radiators.

Figure 3:
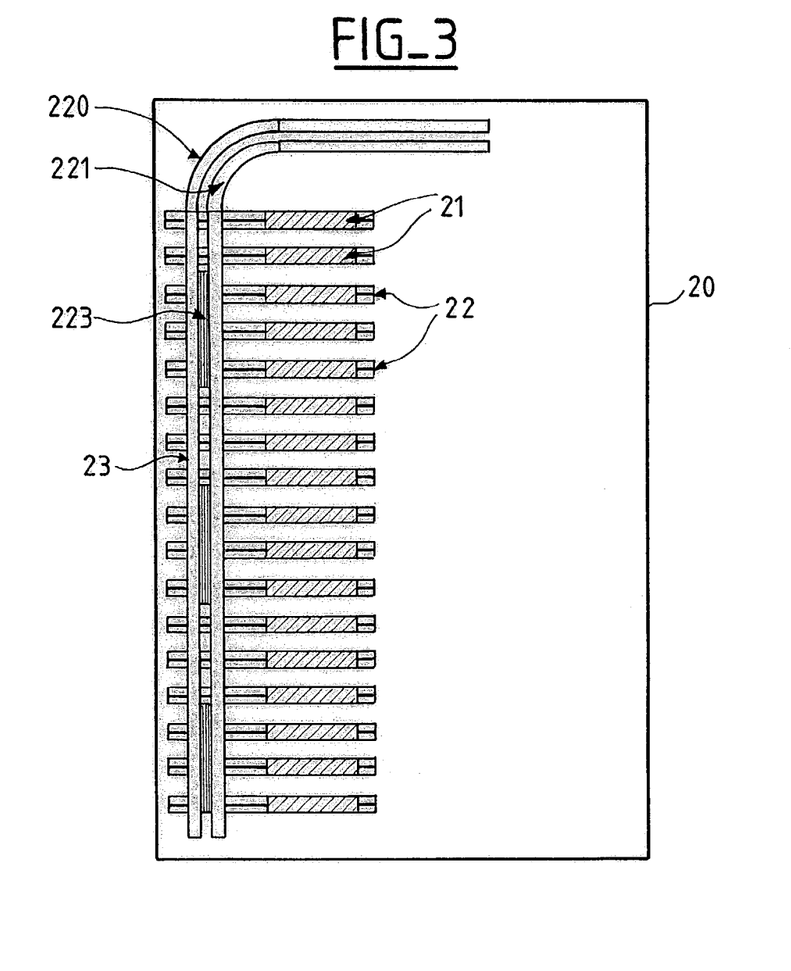
FIG. 3 is a diagram showing a network of heat pipes on which electronic equipment mounted on the internal surface of a satellite panel is arranged.

FIG. 3 shows a network of heat pipes on a panel 20 of a communication module. A number of dissipating equipment units whose presence is indicated in the diagram by their imprint 21 on the heat pipes are installed on this network. The equipment units commonly include traveling wave tube amplifiers (TWTA) for amplifying microwave frequency signals before they are broadcast toward the Earth.

The tubes are carried by one or more heat pipes 22 for transporting and distributing the heat dissipated by the tube. The heat pipes 22 are part of a main network of heat pipes and integrated in or supported on the structural panel of the module 20; they are all parallel to a first preferential direction. A pair of coupling heat pipes 23 crosses the heat pipes 22 in a transverse direction and includes two coupling heat pipes 220 and 221 between which there is an evaporator 223.

Figure 4:
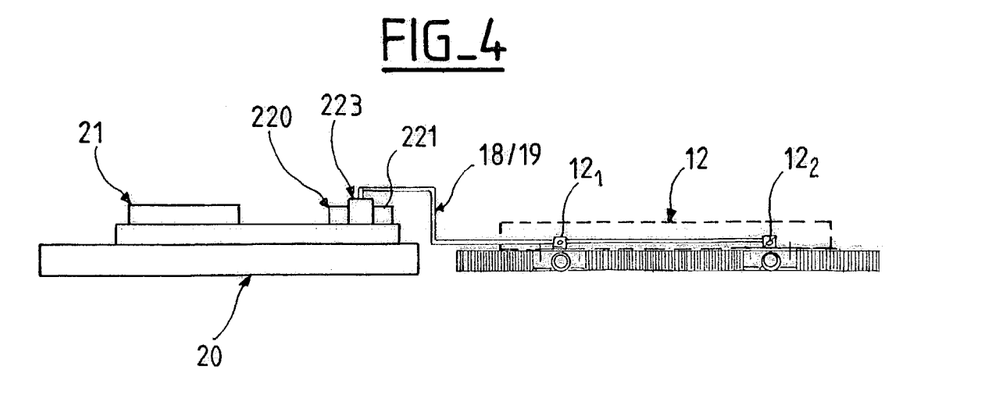
FIG. 4 is a diagrammatic view in section of a satellite structure including one embodiment of a system according to the invention.

FIG. 4 is a sectional view of the module 20. The heat transport lines 18 and 19 connect the evaporator 223, which is located as close as possible to the heat source, i.e. the dissipating equipment, to the heat evacuation area situated on a deployable radiator panel of the satellite, in the vicinity of which there is a condenser 12 consisting of two condenser circuits $12_1$ and $12_2$ connected in parallel.

Figure 5A:
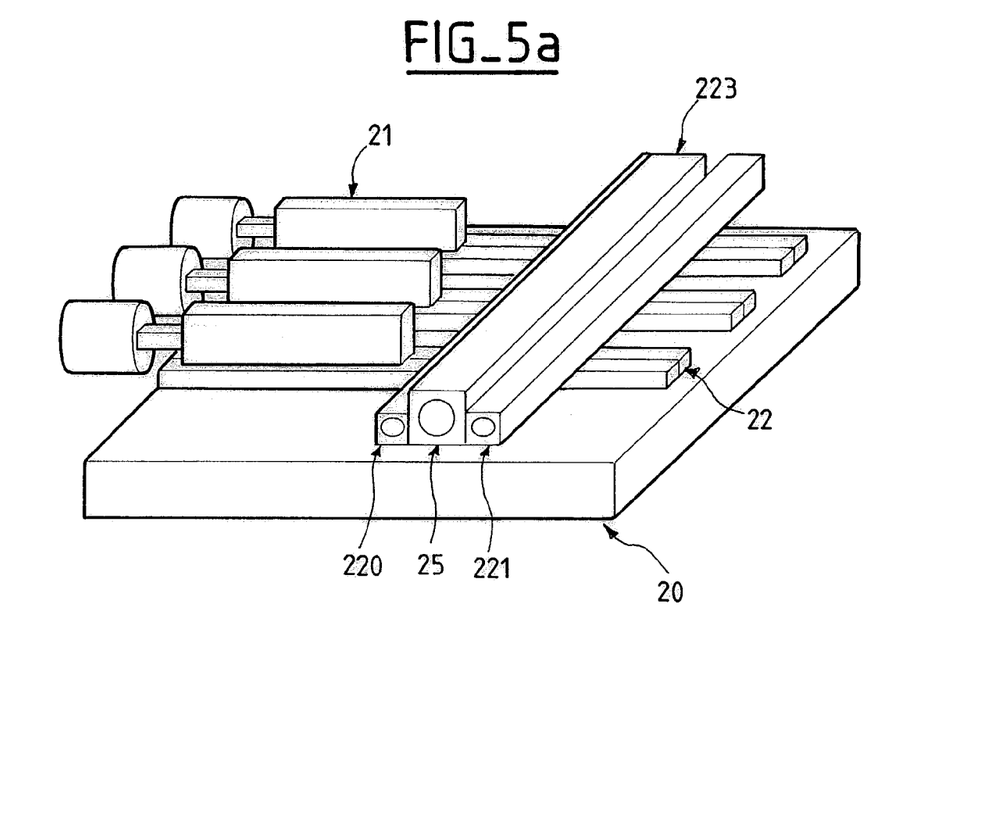
FIGS. 5a, 5c and 5e are diagrammatic perspective views of embodiments of systems according to the invention
Figure 5B:
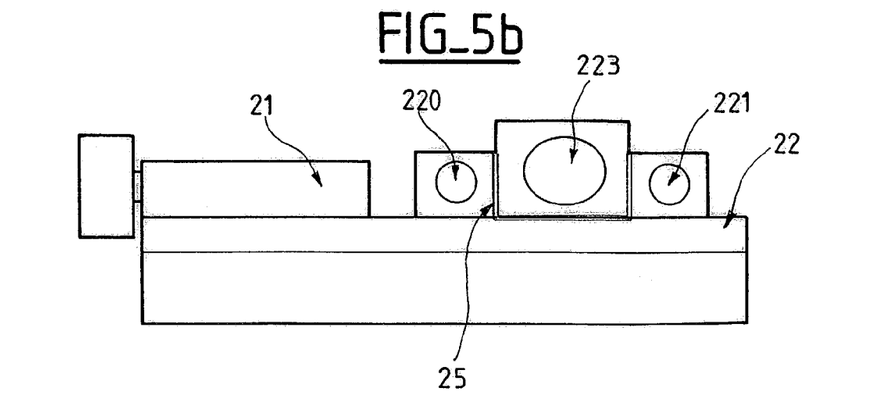
FIGS. 5b, 5d and 5f are respectively cross sectional views corresponding to FIGS. 5a, 5c and 5e.
Figure 5C:
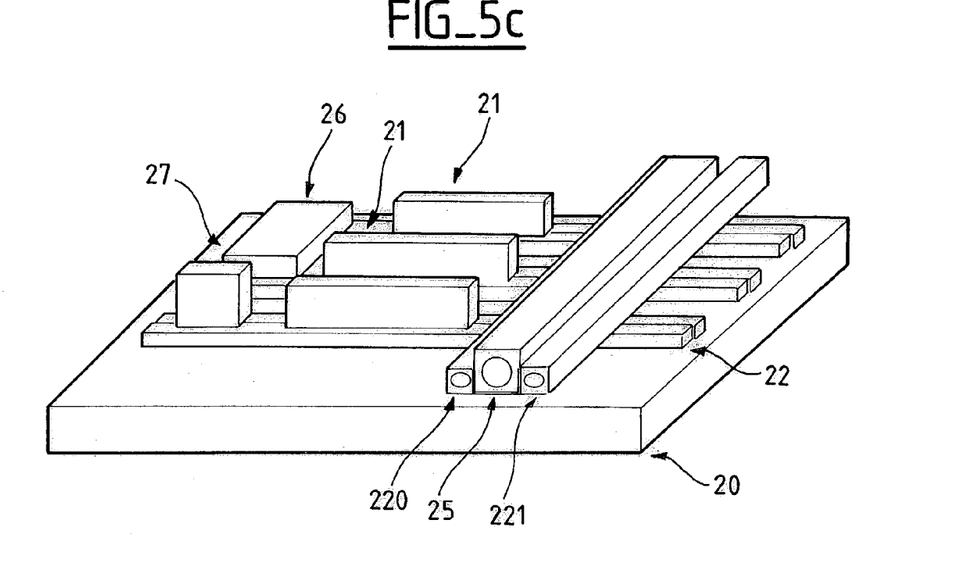
Figure 5D:
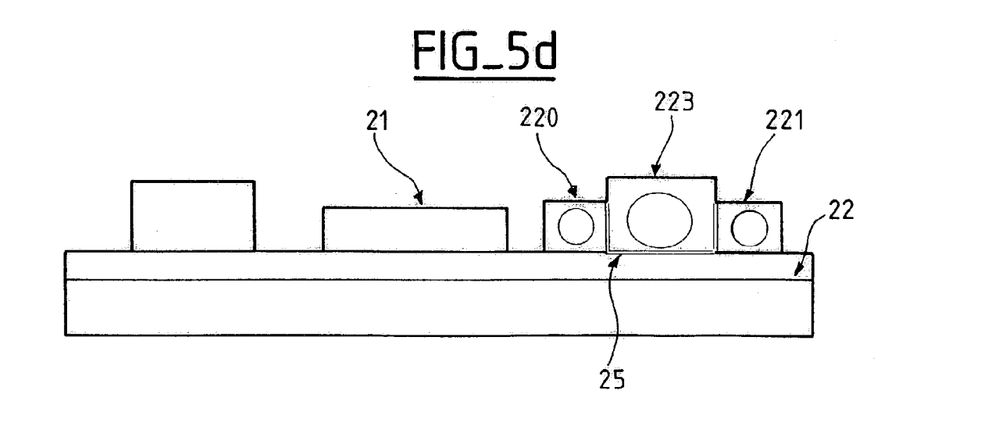
Figure 5E:
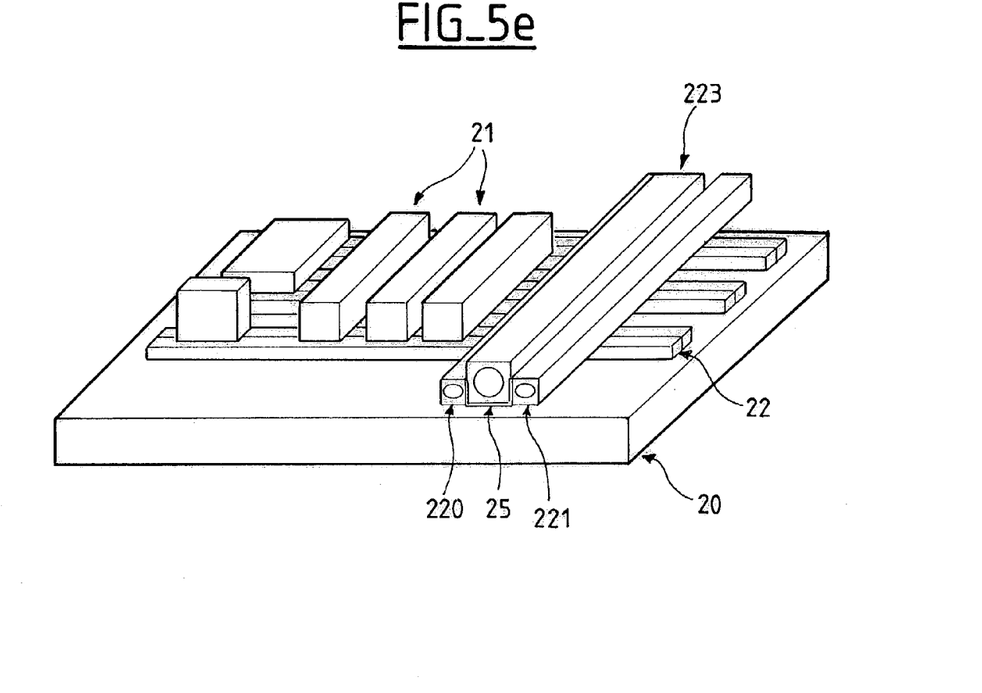
Figure 5F:
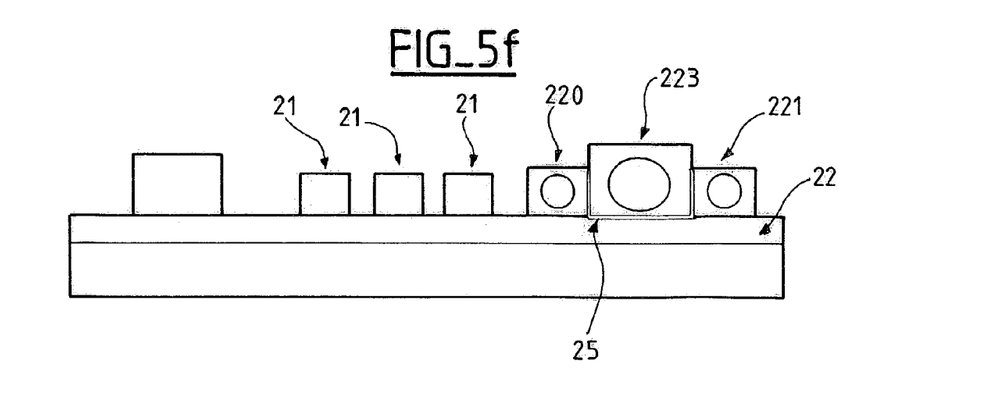

FIGS. 5a, 5c and 5e are diagrammatic perspective views of embodiments of a system according to the invention and figures 5b, 5d and 5f are respective sectional views corresponding to figures 5a, 5c and 5e. FIG. 5a is a diagram showing three radiating collector TWTA 21 each mounted on two heat pipes of the primary network. Those heat pipes cross coupling heat pipes 220, 221. The evaporator 223 is between the coupling heat pipes, as shown in the diagram. This beneficial arrangement provides an optimum contact surface 25 for the transfer of heat to the condenser 12. In this embodiment the evaporator has three useful contact faces.

FIG. 5c is a diagram showing three conductive collector TWTA 21 mounted parallel to the network of primary heat pipes and other heat dissipating equipment such as solid state power amplifiers (SSPA) 16 and filters 27. FIG. 5e shows diagrammatically three conductive collector TWTA 21 mounted perpendicularly to the network of primary heat pipes.

Obviously the invention exploits the usable contact surfaces to recover the heat transmitted by the equipment. Starting from this observation, our researchers have developed various evaporator shapes and configurations, seeking to achieve the required optimization not only in terms of heat capture but also in terms of weight and other critical factors.

Figure 6A:
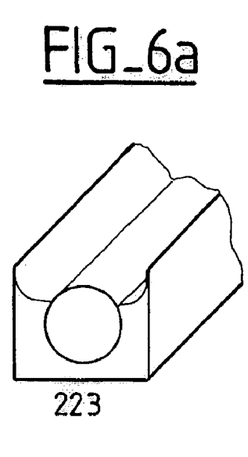
FIGS. 6a to 6c show different conformations of an evaporator according to the invention.
Figure 6B:
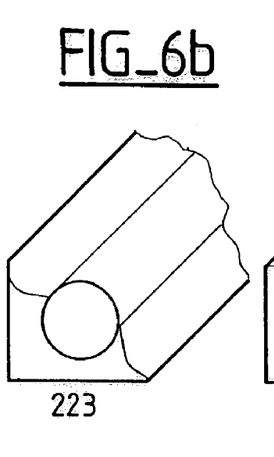
Figure 6C:
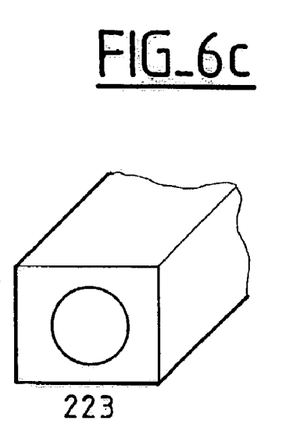

Accordingly, although FIG. 6c shows the same kind of evaporator as FIGS. 4 and 5, FIG. 6a shows an evaporator whose top face is not usable, because it is not in contact either with a heat pipe or with some other source of heat, and has therefore been extruded, i.e. hollowed out. The FIG. 6b evaporator uses the same hollowing out principle, but applied to two faces of the evaporator (a top face and one lateral face). This is because, in the same way that the walls of the faces of the evaporator in contact with the walls of the heat pipes must be maximized, the faces that are not involved in heat exchange must be minimized, which has the additional effect of weight reduction.

The present invention is not limited to the embodiments just described. Thus it is not limited to the equipment referred to above. The TWTA can equally have conductive collectors mounted longitudinally on the network of primary heat pipes or transversely to the network of primary heat pipes. The equipment can also consist of power converters, power supply units, low-noise power amplifiers, pre-amplifiers, solid state amplifiers, filters, dedicated equipment of the satellite platform, or any other equipment dissipating heat onboard the spacecraft.

Furthermore, as explained above, the coupling by surface contact between each wall of the usable faces of the evaporator and the respective walls of the facing heat pipes is achieved over the whole of the smaller of the two facing surfaces. In the embodiments described, the walls of the evaporator are larger than those of the heat pipes. This is not to say that the opposite situation is ruled out.

Similarly, any type of hollowing out configuration other than those shown in FIGS. 6a and 6b can be envisaged.

Finally, any means can be replaced by equivalent means without departing from the scope of the invention.

The invention claimed is:

1. A heat transfer system including a heat transfer passage in the vicinity of a source of dissipated heat on a satellite adapted to collect heat dissipated by said source and a fluid loop including an evaporator having over part of its path a maximum surface area of its external walls in contact with external walls of said heat transfer passage.

2. The system claimed in claim 1 wherein said evaporator is parallel to and between two heat transfer passages and each face of said evaporator facing respective heat transfer passages is thermally coupled to the facing face of said passage by surface contact of fins of said passages and said evaporator.

3. The system claimed in claim 2 wherein said heat transfer passages are coupling heat pipes and a base of said evaporator constituting its third face is coupled by surface contact to a main heat pipe in direct contact with said source.

4. The system claimed in claim 1 wherein said evaporator has a shape with right-angle corners.

5. The system claimed in claim 4 wherein said shape is a square.

6. The system claimed in claim 4 wherein said shape is a rectangle.

7. The system claimed in claim 1 wherein faces of said evaporator having no surfaces in contact with a heat transfer passage are hollowed out.

8. The system of claim 1, wherein the evaporator comprises a capillary wick.

9. The system of claim 1, wherein the fluid loop is sealed from the heat transfer passage.

10. The system claimed in claim 1, wherein at least two external walls of the evaporator over at least part of the evaporator are in contact with external walls of the heat transfer passage.

11. The system claimed in claim 1, wherein at least three external walls of the evaporator over at least part of the evaporator are in contact with external walls of the heat transfer passage.

12. A satellite, comprising:
a heat source;
a heat transfer passage; and
a two phase fluid loop having a vapor phase and a liquid phase and comprising an evaporator and a condenser, wherein the vapor and liquid phases are separated, except in the evaporator and the condenser, and wherein the vapor and liquid phases flow in a same direction within the two phase fluid loop; and
wherein the evaporator has external walls and over at least part of the evaporator a majority of the surface area of the external walls are in contact with external walls of the heat transfer passage.

13. The satellite of claim 12, wherein the two phase fluid loop is sealed from the heat transfer passage.

14. The satellite of claim 12, wherein the heat transfer passage comprises fluid piping in contact with or adjacent the heat source and in contact with or adjacent the evaporator for exchanging heat with the evaporator.

15. The satellite of claim 12, wherein the evaporator is parallel to and between two heat transfer passages and each face of the evaporator facing respective heat transfer passages is thermally coupled to the facing face of the corresponding heat transfer passage by surface contact of the heat transfer passages and the evaporator.

16. The satellite of claim 15, wherein the heat transfer passages are coupling heat pipes and a base of the evaporator constituting a third face of the evaporator is coupled by surface contact to a main heat pipe in direct contact with the heat source.

17. The satellite of claim 12, wherein the evaporator has a cross-sectional shape with right-angle corners, the cross section taken in a direction perpendicular to a longitudinal direction of the evaporator.

18. The satellite of claim 17, wherein the shape is a square.

19. The satellite of claim 17, wherein the shape is a rectangle.

20. The satellite of claim 12, wherein faces of said evaporator having no surfaces in contact with a heat transfer passage are hollowed out.

21. The satellite of claim 12, wherein over at least part of the evaporator a maximum of the surface area of the external walls are in contact with external walls of the heat transfer passage.

22. The satellite of claim 12, wherein at least two external walls of the evaporator over at least part of the evaporator are in contact with external walls of the heat transfer passage.

23. The satellite of claim 12, wherein at least three external walls of the evaporator over at least part of the evaporator are in contact with external walls of the heat transfer passage.

24. A satellite, comprising:
a heat source;
a heat transfer passage; and
a two phase heat exchanger having a vapor phase and a liquid phase and comprising an evaporator and a condenser; and
wherein the evaporator has external walls and over at least part of the evaporator a majority of the surface area of the external walls are in contact with external walls of the heat transfer passage.

25. The satellite of claim 24, wherein the evaporator is parallel to and between two heat transfer passages and each face of the evaporator facing respective heat transfer passages is thermally coupled to the facing face of the corresponding heat transfer passage by surface contact of the heat transfer passages and the evaporator.

26. The satellite of claim 24, wherein faces of said evaporator having no surfaces in contact with a heat transfer passage are hollowed out.

* * * * *